United States Patent
Aichinger et al.

(12)

(10) Patent No.: US 6,518,374 B1
(45) Date of Patent: Feb. 11, 2003

(54) METHOD OF IMMEDIATELY TERMINATING FREE-RADICAL POLYMERISATION PROCESSES

(75) Inventors: Heinrich Aichinger, Mannheim (DE); Gerhard Nestler, Ludwigshafen (DE); Jürgen Schröder, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,417

(22) PCT Filed: Apr. 27, 2000

(86) PCT No.: PCT/EP00/03836
§ 371 (c)(1),
(2), (4) Date: Oct. 29, 2001

(87) PCT Pub. No.: WO00/64947
PCT Pub. Date: Nov. 2, 2000

(30) Foreign Application Priority Data

Apr. 27, 1999 (DE) .......................................... 199 18 970

(51) Int. Cl.$^7$ ................................................. C08F 2/38
(52) U.S. Cl. ........................ 526/84; 526/83; 526/317.1; 526/318; 526/329.7; 252/396; 252/394
(58) Field of Search .......................... 526/83, 84, 317.1, 526/318, 329.7; 252/396, 394

(56) References Cited

U.S. PATENT DOCUMENTS

H1957 H * 4/2001 Fried et al. ................... 526/82

FOREIGN PATENT DOCUMENTS

DE 198 35 730 2/1999
WO WO 99/21893 5/1999

OTHER PUBLICATIONS

Database WPI, Derwent Publications, vol. 405, No. 033, AN 1998–128875, "Apparatus for Introducing Fluid Into Container to Stabilise Contents and Prevent Undesired Reaction—Mounted Above Contents and Having Telescopic Tube, With Bursting Disc at its End, Which is Axially Extended by Fluid Pressure to Contact Contents and Introduce Fluid Only When Needed", Jan. 10, 1998.

Database WPI, Derwent Publications, AN 1992–353904, JP 04–256429, Sep. 11, 1992.

S. Schulze, et al., vol. 21, No. 10, pp. 829–837, "Aspects of the Safe Storage of Acrylic Monomers:Kinetics of the Oxygen Consumption", Oct. 1998.

* cited by examiner

Primary Examiner—David W. Wu
Assistant Examiner—William Cheung
(74) Attorney, Agent, or Firm—Oblon, Spivak, McClelland, Maier & Neustadt, P.C.

(57) ABSTRACT

Free radical polymerizations immediately terminated by a process comprising the addition of an inhibitor solution which contains phenothiazine and at least 50% (w/w) N-alkylpyrrolidone to a system undergoing free radical polymerization, wherein the inhibitor solution also contains p-methoxyphenol (MEHQ).

10 Claims, No Drawings

METHOD OF IMMEDIATELY TERMINATING FREE-RADICAL POLYMERISATION PROCESSES

The present invention relates to a process for the immediate termination of free radical polymerizations. Once initiated, free radical polymerizations are usually highly exothermic, ie. take place with considerable evolution of heat, the heat of polymerization, unless removed, additionally accelerating the free radical polymerization.

If the abovementioned heat removal takes place in an inadequate manner in intentional free radical polymerizations, there is a danger that the polymerization will be so vigorous that the vessel containing the polymerization mixture will explode if the runaway polymerization (for example, free radical mass, solution, emulsion or suspension polymerization of compounds (monomers) having at least one ethylenically unsaturated group) is not counteracted.

Such an effective countermeasure is also required in particular in the case of unintentionally initiated free radical polymerizations. Unintentionally initiated free radical polymerizations may occur, for example, during the storage and/or transport of substances containing monomers, since both heat and light or undesired free radicals can initiate the free radical polymerization of monomers. It is true that an attempt is usually made to prevent such unintentional free radical polymerizations by adding small amounts (as a rule up to 1000 ppm by weight) of free radical polymerization inhibitors (free radical acceptors, polymerization inhibitors) to the monomers. However, their inhibiting effect must not be too pronounced since otherwise they would have to be separated off before subsequent use of the monomers for free radical polymerization purposes. However, free radical polymerization initiators can usually predominate over a moderately inhibiting effect, as possessed, for example, by the monomethyl ether of hydroquinone (p-methoxyphenol-MEHQ), and it is for this reason that MEHQ is a storage and/or transport stabilizer particularly frequently used for monomers. However, experience has shown that, even in the case of monomers stabilized with storage and/or transport stabilizers, an unintentional free radical polymerization of said monomers cannot be completely ruled out. The latter applies in particular when the monomers are (meth)acrylic monomers and/or styrene, which particularly readily undergo free radical polymerization.

The term (meth)acrylic monomers is to be understood here as meaning substances which comprise acrolein, methacrolein, acrylic acid, methacrylic acid and/or esters of the two abovementioned acids. In this publication, (meth) acrylic is generally used as an abbreviation for acrylic and/or methacrylic.

Especially substances which comprise at least 90% by weight of (meth)acrylic monomers and/or styrene are at risk with regard to an unintentional free radical polymerization (this also applies when polymerization inhibitors are added as a preventive measure). This applies in particular when such substances are exposed to extreme external conditions during transport and/or during storage (for example, extremely high temperatures during transport by ship through various climatic zones (eg. across the equator), as is the case, for example, for transport from Europe to Southeast Asia, or extremely low temperatures, as in the case of storage in outdoor tanks in northern countries). In particular, low temperatures are not without risks since they can in extreme cases lead to partial or complete crystallization of the monomers. The latter usually results in separation of monomers and stabilizer (purification by crystallization), which may lead to the presence of unstabilized regions of monomers and subsequent melting for a certain duration, which regions can with high probability be the starting point of an unintentional free radical polymerization.

For safe transport and/or safe storage of monomer-containing substances, there is therefore a need for a process which is capable of very rapidly terminating an unintentionally initiated free radical polymerization of the monomers. Such a process is also required, however, for stopping runaway unintentional free radical polymerizations immediately.

The processes known to date which envisage the addition of a known inhibitor solution are very unreliable at low temperatures owing to the crystallization of the inhibitor solution.

It is an object of the present invention to provide a process for immediately terminating free radical polymerizations which is also applicable at temperatures below 0° C.

We have found that this object is achieved by a process for immediately terminating free radical polymerizations, comprising the addition of an inhibitor solution which contains phenothiazine and at least 50% (w/w) N-alkylpyrrolidone to a system undergoing free radical polymerization.

The object is achieved, according to the invention, if the inhibitor solution also contains p-methoxyphenol (MEHQ).

The advantageous nature of the novel process is a result of intensive and extensive research activity, as follows:

compared with the recommendation of EP-B 64628 and EP-A 200181 to add a polymerization inhibitor solution based on hydroquinone or butylpyrocatechol or derivatives thereof for immediately terminating a free radical polymerization, the inhibitor solution to be added according to the invention containing phenothiazine contains a substantially more efficient and more broadly applicable free radical polymerization inhibitor;

compared with the recommendation of Res. Dicl. 1989, 300, 245 (Eng.) to add an aqueous Cu(II) salt solution for immediately terminating an unintentional free radical polymerization of acrylic acid, inhibitor solutions based on N-alkylpyrrolidone are as a rule, on the one hand, miscible both with aqueous and with nonaqueous systems and, on the other hand, also subsequently readily separable from such systems;

Process Saf. Prog. 12(2) (1993), 111–114 recommends, for immediately terminating an unintentional free radical polymerization of acrylic acid, adding thereto an inhibitor solution based on phenothiazine, but this prior art contains no indication that the phenothiazine is to be added in solution in a solvent comprising mainly N-alkylpyrrolidone.

PCT/EP98/06814 of Oct. 27, 1998 describes a process for immediately terminating free radical polymerizations, comprising the addition of an inhibitor solution which contains phenothiazine and at least 50% (w/w) N-alkylpyrrolidone to a system undergoing free radical polymerization. However, the resulting inhibitor solution crystallizes close to 0° C. It is not mentioned that the addition of p-methoxyphenol (MEHQ) to the inhibitor solution would be advantageous. By adding MEHQ to the inhibitor solution, however, the crystallization point of the inhibitor solution is dramatically lowered so that the inhibitor solution can now also be reliably used at temperatures below 0° C.

The crystallization-inhibiting properties of MEHQ to this extent are completely surprising. To date, MEHQ has been added only as a storage and/or transport stabilizer to the monomers capable of free radical polymerization.

Further advantages of the novel procedure are that N-alkylpyrrolidones are inert to most substances. Furthermore, the boiling point of N-alkylpyrrolidones is above the boiling point of most monomers, facilitating subsequent separation from the monomers and permitting subsequent further use of the monomers. Moreover, the high boiling point of the N-alkylpyrrolidones prevents the formation of explosive vapor/oxygen mixtures in hot climatic zones. Furthermore, N-alkylpyrrolidones generally have a low melting point, which permits their use even in northern countries. Another advantage is the low flashpoint of N-alkylpyrrolidones and their low toxicity, if they are toxic at all. However, the fact that phenothiazine has high solubility in N-alkylpyrrolidone at room temperature (25° C.) is very particularly advantageous for the novel process. This permits the novel use of phenothiazine solutions having a high phenothiazine content without the risk of the phenothiazine being immediately partially or completely precipitated from the solution with a change of outdoor temperature.

The addition of phenothiazine as such for immediately terminating free radical polymerizations is a disadvantage in that the low degree of division of the phenothiazine as such is not appropriate for the required immediate termination. N-alkylpyrrolidones preferred according to the invention are those with alkyl groups of 1 to 8 carbon atoms. Particularly preferred among these are the N-alkylpyrrolidones whose alkyl group is of 1 to 6 carbon atoms. Very particularly preferred N-alkylpyrrolidones are N-methylpyrrolidone and N-ethylpyrrolidone. In addition to N-alkylpyrrolidones, the phenothiazine solution to be added according to the invention may also contain other solvents. Suitable solvents of this type are all those which are miscible with N-alkylpyrrolidones. Examples of such solvents are biphenyl, diphenyl ether, toluene, xylene, dimethyl phthalate, butyl acetate and 2-ethylhexyl acetate. N,N-dialkylcarboxamides whose alkyl groups are preferably of 1 to 8 carbon atoms are furthermore suitable as such other solvents. Particularly advantageous alkyl groups are methyl, ethyl and n-butyl. N,N-dialkylcarboxamides of $C_1$–$C_3$-alkanecarboxylic acids are also particularly advantageous. N,N-dialkylcarboxamides particularly advantageous according to the invention are N,N-dimethylformamide and N,N-dimethylacetamide.

The solvent of the phenothiazine solution to be added according to the invention preferably comprises at least 75%, particularly preferably at least 85%, very particularly preferably at least 95%, based on the weight of said solvent, of N-alkylpyrrolidone. According to the invention, the solvent of the phenothiazine solution advantageously consists exclusively of N-alkylpyrrolidone, in particular exclusively of N-methylpyrrolidone or exclusively of N-ethylpyrrolidone.

In addition to phenothiazine and MEHQ, the inhibitor solution to be added according to the invention may also contain other polymerization inhibitors. Examples of these are hydroquinone, diphenylamine, p-phenylenediamines, nitroxyl radicals (compounds which have at least one >N-O*-group), compounds which have a nitroso group, ie. a group —N=O, and hydroxylamines.

Nitroxyl radicals (also referred to as N-oxyl radicals) which are particularly suitable according to the invention are those derived from a secondary amine which carries no hydrogen atoms on the a-carbon atoms (ie. the N-oxyl groups are derived from corresponding secondary amino groups). Particularly suitable among these are the N-oxyl radicals which are stated in EP-A 135280, the prior application DE-A 19651307, U.S. Pat. No. 5,322,912, U.S. Pat. No. 5,412,047, U.S. Pat. No. 4,581,429, DE-A 1618141, CN-A 1052847, U.S. Pat. No. 4,670,131, U.S. Pat. No. 5,322,960, the prior application DE-A 19602539, EP-A 765856 and JP-A 5/320217.

Such suitable, stable N-oxyl radicals derived from a second amine are, for example, those of the general formula I

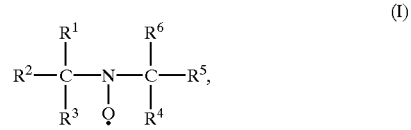

where $R^1$, $R^2$, $R^5$ and $R^6$ are the same or different straight-chain or branched, unsubstituted or substituted alkyl groups and $R^3$ and $R^4$ are the same or different straight-chain or branched, unsubstituted or substituted alkyl groups or $R^3CNCR^4$ is an unsubstituted or substituted, cylic structure.

Compounds I which are particularly suitable according to the invention are those which are stated in EP-A 135 280, the prior application DE-A 19651307, U.S. Pat. No. 5,322,912, U.S. Pat. No. 5,412,047, U.S. Pat. No. 4,581,429, DE-A 16 18 141, CN-A 1052847, U.S. Pat. No. 4,670,131, U.S. Pat. No. 5,322,960 and the prior application DE-A 19602539.

Examples of these are the stable N-oxyl radicals of the general formula I where $R^1$, $R^2$, $R^5$ and $R^6$ are (identical or different) $C_1$–$C_4$ alkyl groups, such as methyl, ethyl, n-propyl, isopropyl, n-butyl, isobutyl or tert-butyl, linear or branched pentyl, phenyl or a substituted group thereof and $R^3$ and $R^4$ are (identical or different) $C_1$–$C_4$ alkyl groups, such as methyl, ethyl, n-propyl, isopropyl, n-butyl, isobutyl or tert-butyl, linear or branched pentyl or a substituted group thereof or, together with CNC, are the cyclic structure

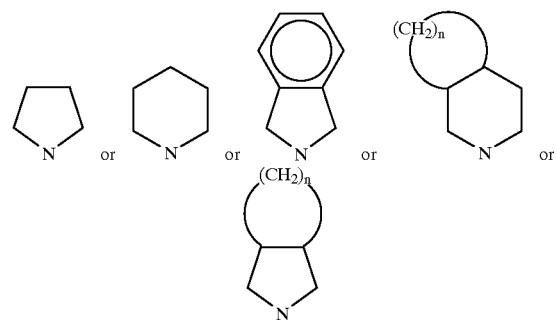

where n is an integer from 1 to 10 (frequently from 1 to 6), including substituted cyclic structures of this type. Typical examples are 2,2,6,6-tetramethyl-1-oxylpiperidine, 2,2,5,5-tetramethyl-1-oxylpyrrolidine and 4-oxo-2,2,6,6-tetramethyl-1-oxylpiperidine.

The N-oxyl radicals I can be prepared from the corresponding secondary amines by oxidation, for example with hydrogen peroxide. As a rule, they can be prepared as pure substance.

The N-oxyl radicals I suitable according to the invention include in particular piperidine- or pyrrolidine-N-oxyls and di-N-oxyls of the following general formulae II to IX:

(II)
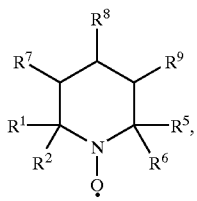

(III)
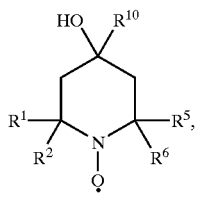

(IV)
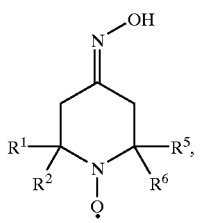

(V)
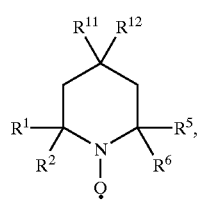

(VI)
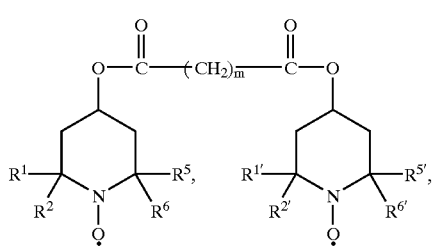

(VII)
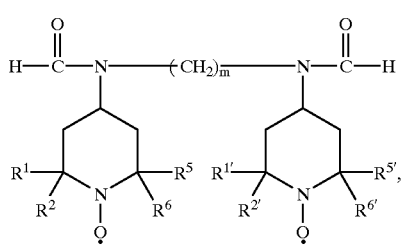

(VIII)
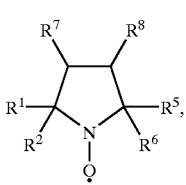

(IX)
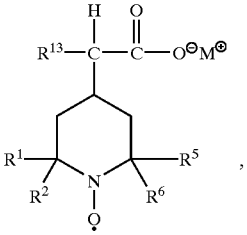

where m is from 2 to 10, $R^7$, $R^8$ and $R^9$, independently of one another, are each

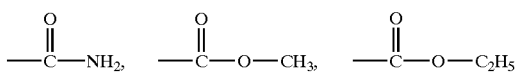

$M^{\ominus}$ is a hydrogen ion or an alkali metal ion, q is an integer from 1 to 10, $R^{1'}$, $R^{2'}$, $R^{5'}$, $R^{6'}$, independently of one another, and independently of $R^1$, $R^2$, $R^5$ and $R^6$, are the same groups as $R^1$, $R^{10}$ is $C_1$–$C_4$-alkyl, —CH=$CH_2$, —C≡CH, —CN,

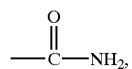

—COO$^{\ominus}$M$^{\oplus}$, —COOCH$_3$ or —COOC$_2$H$_5$, $R^{11}$ is an organic radical which has at least one primary, secondary (eg. —NHR$^1$) or tertiary amino group (eg. —NR$^1$R$^2$) or at least one ammonium group —N$^{\oplus}$R$^{14}$R$^{15}$R$^{16}$X$^{\ominus}$, where X$^{\ominus}$ is F$^{\ominus}$, Cl$^{\ominus}$, Br$^{\ominus}$, HSO$_4$, SO$_4^{2-}$, H$_2$PO$_4$, HPO$_4^{2-}$ or PO$_4^{3-}$ and R$^{14}$, R$^{15}$ and R$^{16}$ are organic radicals independent of one another (eg. independently of one another and independently of R$^1$, are the same groups as R$^1$), $R^{12'}$, independently of $R^{11}$, is one of the same groups as $R^{11}$ or —H, —OH, $C_1$–$C_4$-alkyl, —COO$^{\ominus}$M$^{\oplus}$, —C≡CH, $$\overset{O}{\underset{\|}{-C-NH_2,}}$$

or hydroxyl-substituted $C_1$–$C_4$-alkyl (eg. hydroxyethyl or hydroxypropyl) or $R^{11}$ and $R^{12}$ together are the oxygen of a carbonyl group and

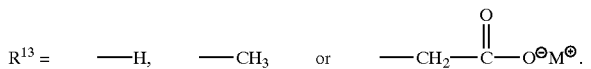

Preferably, $R^1=R^2=R^5=R^6=R^{1'}=R^{2'}=R^{5'}=R^{6'}=CH_3$.

Examples of typical N-oxyl radicals suitable according to the invention are 4-hydroxy-2,2,6,6-tetramethyl-1-oxylpiperidine,
4-hydroxy-2,6-diphenyl-2,6-dimethyl-1-oxylpiperidine,
4-carboxy-2,2,6,6-tetramethyl-1-oxylpiperidine,
4-carboxy-2,6-diphenyl-2,6-dimethyl-1-oxylpiperidine,
3-carboxy-2,2,5,5-tetramethyl-1-oxylpyrrolidine,
3-arboxy-2,5-diphenyl-2,5-dimethyl-1-oxylpyrrolidine,
4-acetyl-2,2,6,6-tetramethyl-1-oxylpiperidine,
N,N'-bis(1 oxyl-2,2,6,6-tetramethylpiperidin-4-yl)-N,N'-bisformyl-1,6-diaminohexane and
bis(1-oxyl-2,2,6,6-tetramethylpiperidin-4-yl) adipate.

The preparation of 3-carboxy-2,2,5,5-tetramethyl-1-oxyl-pyrrolidine is described, for example in Romanelli, M., Ottaviani, M. F., Martini, G., Kevan, L., JPCH J: Phys. Chem., EN, 93, 1 (1989), 317–322.

The compounds (VI) and (VII) can be obtained according to U.S. Pat. No. 4665185 (eg. Example 7) and DE-A 19510184.

Further suitable typical examples are:

Sunamoto, Junzo; Akiyoshi, Kuzunari, Kihara, Tetsuji; Endo, Masayuki, BCS JA 8, Bull, Chem. Soc. Jpn., EN, 65, 4 (1992), 1041–1046;

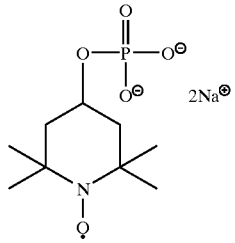

Beilstein Registry Number 6926369 ($C_{11}H_{22}N_3O_2$);

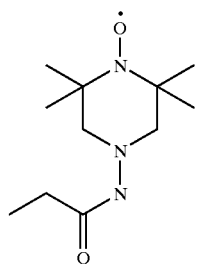

Beilstein Registry Number 6498805 (4-amino-2,2,6,6-tetramethyl-1-oxyl-piperidine);

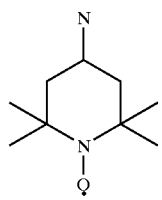

Beilstein Registry Number 6800244 ($C_{11}H_{22}N_2O_2$);

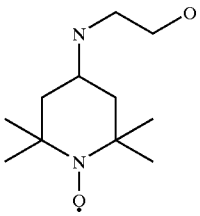

Beilstein Registry Number 5730772 (N-methyl-4-amino-2,2,6,6-tetra-methyl-1-oxylpiperidine

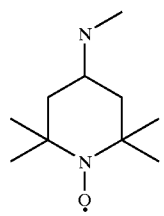

Beilstein Registry Number 5507538 (2,2,6,6-tetramethyl-4-(2-aminoethylamino)-1-oxylpiperidine);

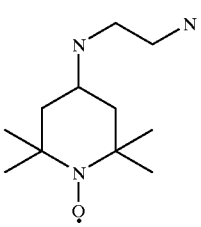

Beilstein Registry Number 4417950 (4<bis(2-hydroxyethyl)>-amino-2,2,6,6-tetramethyl-1-oxyl-piperidine);

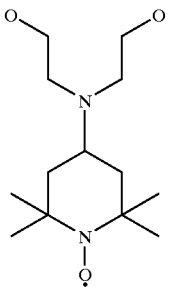

Beilstein Registry Number 4396625 ($C_{12}H_{25}N_2O_2$);

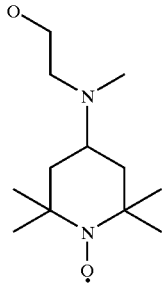

Beilstein Registry Number 4139900 (4-amino-2,2,6,6-tetramethyl-4-carboxyl-1-oxylpiperidine);

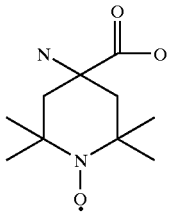

Beilstein Registry Number 4137088 (4-amino-4-cyano-2,2,6,6-tetramethyl-1-oxylpiperidine);

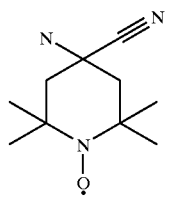

Beilstein Registry Number 3942714 ($C_{12}H_{25}N_2O_2$);

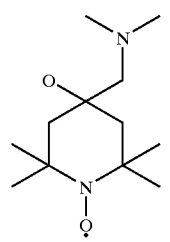

Beilstein Registry Number 1468515 (2,2,6,6-tetramethyl-4-hydroxy-4-acetyl-1-oxylpiperidine);

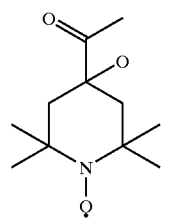

Beilstein Registry Number 1423410 (2,2,4,6,6-pentamethyl-4-hydroxy-1-oxylpiperidine);

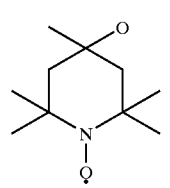

Beilstein Registry Number 6205316 (4-carboxymethylene-2,2,6,6-tetramethyl-1-oxylpiperidine);

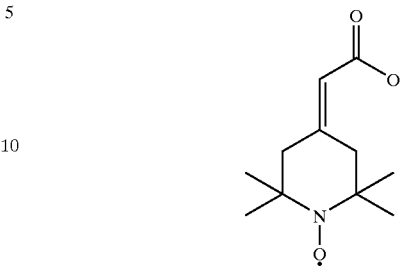

Beilstein Registry Number 1395538 (4-<2-carboxy-benzoyloxy>-2,2,6,6-tetramethyl-1-oxylpiperidine);

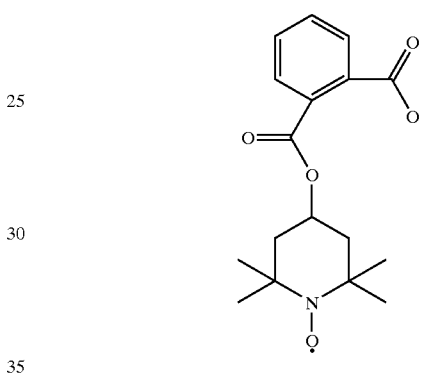

Beilstein Registry Number 3546230 (4-carboxymethyl-2,2,6,6-tetramethyl-1-oxylpiperidine);

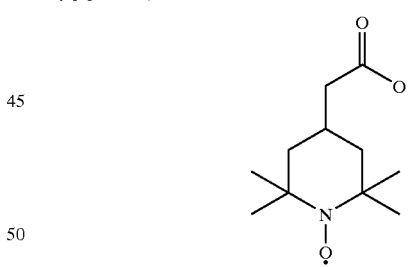

Beilstein Registry Number 3949026 (4-carboxy-2,2,6,6-tetramethyl-1-oxylpiperidine);

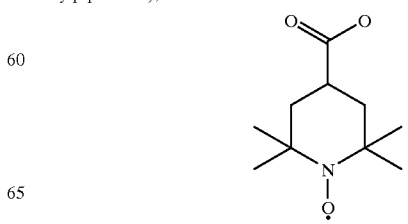

-continued

Beilstein Registry Number 4611003 (N-1-oxy-2,2,6,6-tetramethylpiperidine-4-yl)-ethylenediaminetetra-acetamide);

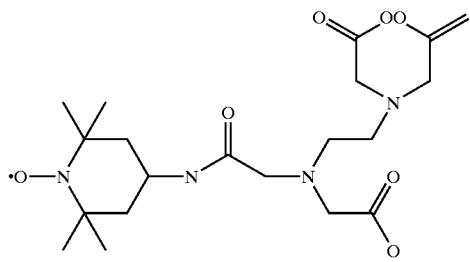

Beilstein Registry Number 5961636 ($C_{13}H_{21}N_2O_4$)

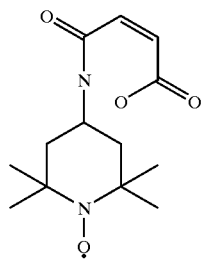

Beilstein Registry Number 5592232 ($C_{15}H_{27}N_2O_4$);

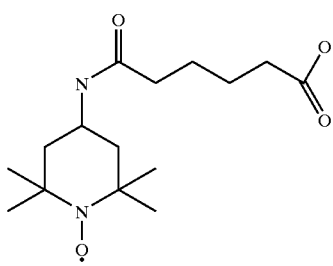

Beilstein Registry Number 5080576 (N-(2,2,6,6-tetramethyl-1-oxyl-piperdin-4-yl)succinamide;

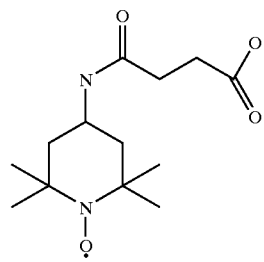

Beilstein Registry Number 5051814 (4-(4-hydroxybutanoylamino)-2,2,6,6-tetramethyl-1-oxylpiperdine);

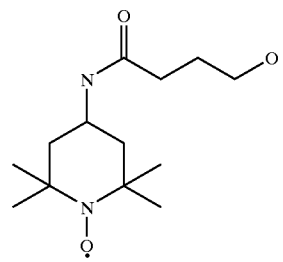

-continued

Beilstein Registry Number 4677496 (2,2,6,6-tetramethyl-4-oximino-1-oxylpiperidine);

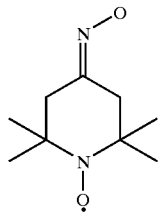

Beilstein Registry Number 1451068 ($C_{11}H_{18}NO_2$);

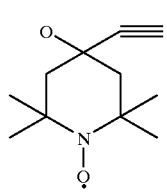

Beilstein Registry Number 141075 ($C_{11}H_{20}NO_2$);

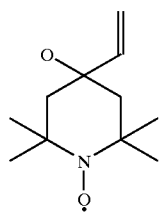

Beilstein Registry Number 1423698 (4-ethyl-4-hydroxy-2,2,6,6-tetramethyl-1-oxylpiperdine);

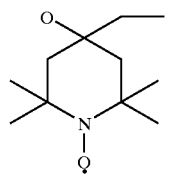

Beilstein Registry Number 5509793 (4-ethoxymethyl-4-hydroxy-2,2,6,6 tetramethyl-1-oxylpiperidine);

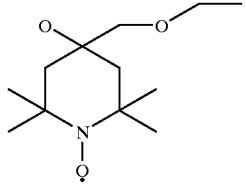

Beilstein Registry Number 3960373 ($C_{10}H_{19}N_2O_3$);

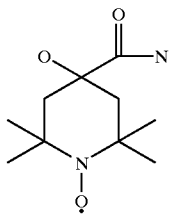

-continued
Beilstein Registry Number
(C₁₀H₁₇N₂O₂);

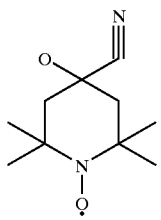

Beilstein Registry Number
3985130(2,2,6,6-tetramethyl-1-oxyl-
4-piperidylidene)succinic acid).

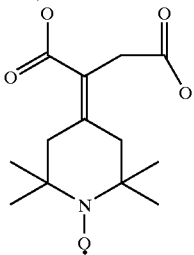

According to the invention, mixtures of an N-oxyl radical can of course also be used in addition to phenothiazine.

Organic nitroso compounds suitable according to the invention are, for example, N-nitrosoarylamines or nitroso compounds having a nitroso group bonded directly to a carbon atom of an aromatic nucleus. Examples are nitrosophenols, such as 4-nitrosophenol, nitrosonaphthols, such as 2-nitroso-1-naphthol, nitrosobenzene, N-nitroso-N-methylurea, nitroso-N,N-dialkylanilines where alkyl is methyl, ethyl, propyl and/or butyl, N-nitrosodiphenylamine, N-nitrosophenylnaphthylamine, 4-nitrosodinaphthylamine and p-nitrosodiphenylamine. According to the invention, mixtures of the abovementioned nitroso compounds can of course also be used in addition to phenothiazine.

p-Phenylenediamines suitable according to the invention are those of the general formula X

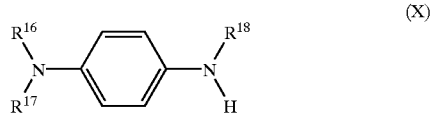 (X)

where
R¹⁶, R¹⁷ and R¹⁸, independently of one another, are each alkyl, aryl, alkaryl or aralkyl of up to 20 carbon atoms or hydrogen.

Compounds X where $R^{16}$, $R^{17}$ and $R^{18}$, independently of one another, are each methyl, ethyl, propyl, isopropyl, isobutyl, sec-butyl, n-butyl, pentyl, phenyl or naphthyl are particularly suitable. Examples of suitable compounds X are: N,N'-bis-sec-butyl-p-phenylenediamine, N-phenyl-N'-isopropylphenylenediamine, N-naphthyl-N'-sec-butyl-p-phenylenediamine, N,N,N'-trimethyl-p-phenylene-diamine, N,N,N'-triethyl-p-phenylenediamine, N,N-dimethyl-p-phenylene-diamine, NN-diethyl-p-phenylenediamine, N-phenyl-N',N'-dimethyl-p-phenylenediamine, N-phenyl-N',N'-diethyl-p-phenylenediamine, N-phenyl-N',N'-dipropyl-p-phenylenediamine, N-phenyl-N',N'-di-n-butyl-p-phenylene-diamine, N-phenyl-N',N'-di-sec-butyl-p-phenylenediamine, N-phenyl-N'-methyl-N'-ethyl-p-phenylenediamine, N-phenyl-N'-methyl-N'-propyl-p-phenylenediamine, N-phenyl-N'-methyl-p-phenylenediamine, N-phenyl-N'-ethyl-p-phenylenediamine, N-phenyl-N'-propyl-p-phenylenediamine, N-phenyl-N'-isopropyl-p-phenylenediamine, N-phenyl-N'-butyl-p-phenylenediamine, N-phenyl-N'-isobutyl-p-phenylenediamine, N-phenyl-N'-sec-butyl-p-phenylenediamine, N-phenyl-N'-tert-butyl-p-phenylenediamine, N-phenyl-N'-n-pentyl-p-phenylenediamine, N-phenyl-N'-n-hexyl-p-phenylenediamine, N-phenyl-N'-(1-methylhexyl)p-phenylenediamine, N-phenyl-N'-(1,3-dimethylbutyl)p-phenylenediamine, N-phenyl-N'-(1,4-dimethylpentyl)-p-phenylenediamine and p-phenylenediamine. According to the invention, mixtures of p-phenylenediamines may also be used in addition to phenothiazine. Particularly suitable mixtures of this type are the p-phenylenediarnine mixtures recommended in WO 92/01665.

According to the invention, mixtures of all different abovementioned polymerization inhibitors may of course also be used in addition to phenothiazine and MEHQ.

Phenothiazine solutions which are preferred according to the invention are those whose total content of polymerization inhibitor comprises at least 50, particularly preferably at least 75, very particularly preferably at least 90, % by weight of phenothiazine. Particularly advantageously, no further polymerization inhibitor apart from phenothiazine and MEHQ is present in the inhibitor solution to be added according to the invention. MEHQ scarcely acts as an inhibitor in the inhibitor solution.

As a rule, the content of phenothiazine in the inhibitor solutions to be used according to the invention is at least 10, preferably at least 20, particularly preferably at least 30, % (w/w), based on the solution.

According to the invention, a solution of phenothiazine in methylpyrrolidone, whose phenothiazine content is advantageously from 35 to 45%, based on the solution, is preferred. Frequently, the phenothiazine content of the abovementioned solution is 35% (w/w).

The content of the crystallization-inhibiting MEHQ in the inhibitor solution is preferably from 2.5 to 12.5% (w/w), in particular from 5 to 10% (w/w), based on the weight of the inhibitor solution.

In particularly preferred embodiments of the invention, the inhibitor solution comprises 35% of phenothiazine, 5% of MEHQ and 60% of N-methylpyrrolidone or 30% of phenothiazine, 10% of MEHQ and 60% of N-methylpyrrolidone (in each case w/w).

The novel process is suitable for immediately terminating any type of free radical polymerizations even below 0° C., in particular those unintentional and/or runaway free radical polymerizations mentioned at the beginning of this publication.

These include in particular the unintentional free radical polymerizations of those substances which comprise at least 95 or at least 98 or at least 99 or 100% by weight of (meth)acrylic monomers. Particularly suitable (meth)acrylic monomers are (meth)acrylic acid and esters or (meth)acrylic acid and monohydric or polyhydric alcohols. This applies in particular when the monohydric or polyhydric alkanols are of one to twenty carbon atoms or one to twelve carbon atoms or one to eight carbon atoms. Typical examples of such esters are for example methyl acrylate, ethyl acrylate, n-butyl acrylate, isobutyl acrylate, tert-butyl acrylate, 2-ethylhexyl acrylate, methyl methacrylate, ethyl methacrylate, n-butyl methacrylate and tert-butyl methacrylate.

The invention furthermore relates to an apparatus for carrying out a novel process.

It is expedient in terms of application technology to introduce the inhibitor solution to be added according to the invention via a spray nozzle in order to achieve very rapid homogeneous distribution in the system undergoing free radical polymerization. The apparatuses described in DE-A 197 49 859 and DE-A 198 22 492 are particularly suitable for introducing the inhibitor solution into the system undergoing polymerization.

Of course, the abovementioned homogenization can also be supported by circulation by means of a pump and/or by stirring. However, such mechanical auxiliary measures also entail the danger of acceleration of the polymerization since they are also associated with introduction of energy into the system undergoing free radical polymerization. The phenothiazine solution to be introduced is expediently contained in a suitable storage container. If the novel process for immediately terminating the free radical polymerization of (meth)acrylic monomers unintentionally polymerizing in the absence of a solvent, the total added amount of phenothiazine should be from about 0.01 to 3% by weight, based on the (meth)acrylic monomers. As a rule, an added amount of from 0.01 to 0.05, frequently 0.025, % by weight of phenothiazine is sufficient.

EXAMPLE

| Composition of the inhibitor solution | Crystallization point |
|---|---|
| 35% (w/w) phenothiazine<br>65% (w/w) N-methylpyrrolidone | +2° C. |
| 35% (w/w) phenothiazine<br>5% (w/w) MEHQ<br>60% (w/w) N-methylpyrrolidone | −11° C. |

Comparison of the crystallization point of an inhibitor solution containing MEHQ with that of an inhibitor solution without MEHQ shows that MEHQ lowers the crystallization point and extends the operating range by 13° C., from 2° C. to −11° C. The effect of phenothiazine as a polymerization inhibitor is not impaired.

We claim:

1. A process for immediately terminating free radical polymerizations comprising the addition of an inhibitor solution which contains phenothiazine and at least 50% (w/w) N-alkylpyrrolidone—based on the weight of said inhibitor solution—to a system undergoing free radical polymerization, wherein the inhibitor solution also contains "2.5 to 12.5% (w/w)" p-methoxyphenol.

2. The process as claimed in claim 1, wherein the N-alkylpyrrolidone is N-methylpyrrolidone or N-ethylpyrrolidone.

3. The process as claimed in claim 1, wherein the phenothiazine content of the inhibitor solution is at least 10% (w/w) based on the weight of said inhibitor solution.

4. The process as claimed in claim 1, wherein the p-methoxyphenol content of the inhibitor solution is from 5 to 10% (w/w), based on the weight of said inhibitor solution.

5. The process as claimed in claim 1, wherein the phenothiazine content of the inhibitor solution is at least 10% (w/w) based on the weight of said inhibitor solution.

6. The process as claimed in claim 2, wherein the phenothiazine content of the inhibitor solution is at least 10% (w/w) based on the weight of said inhibitor solution.

7. The process as claimed in claim 1, wherein the system undergoing free radical polymerization comprises (meth) acrylic monomers undergoing free radical mass polymerization.

8. The process as claimed in claim 7, wherein the (meth) acrylic monomer is (meth)acrylic acid.

9. The process as claimed in claim 7, wherein the (meth) acrylic monomer is a (meth)acrylic ester.

10. An inhibitor solution, containing at least 10% (w/w) phenothiazine, from 5 to 10% (w/w) p-methoxyphenol and at least 50% (w/w) N-methylpyrrolidone, in each case based on the weight of said inhibitor solution.

* * * * *

UNITED STATES PATENT AND TRADEMARK OFFICE
CERTIFICATE OF CORRECTION

PATENT NO.     : 6,518,374 B1
DATED          : February 11, 2003
INVENTOR(S)    : Heinrich Aichinger et al.

It is certified that error appears in the above-identified patent and that said Letters Patent is hereby corrected as shown below:

Column 16,
Lines 7-8, "contains "2.5 to 12.5% (w/w)" p-methoxyphenol" should read
-- contains 2.5 to 12.5% (w/w) p-methoxyphenol --
Line 19, "claimed in claim 1" should read -- claimed in claim 4 --

Signed and Sealed this

Fifth Day of August, 2003

JAMES E. ROGAN
*Director of the United States Patent and Trademark Office*